United States Patent
Nashiki

[11] Patent Number: 6,013,962
[45] Date of Patent: Jan. 11, 2000

[54] PERMANENT MAGNET MOTOR WITH SPECIFIC MAGNETS AND MAGNETIC CIRCUIT ARRANGEMENT

[75] Inventor: Masayuki Nashiki, Niwa-gun, Japan

[73] Assignee: Okuma Corporation, Nagoya, Japan

[21] Appl. No.: 09/215,222

[22] Filed: Dec. 18, 1998

[30] Foreign Application Priority Data

Jan. 6, 1998 [JP] Japan .................................. 10-000822

[51] Int. Cl.[7] .................................................. H02K 37/00
[52] U.S. Cl. ......................... 310/156; 310/152; 310/49 R
[58] Field of Search ................................. 310/156, 49 R, 310/187, 114, 152

[56] References Cited

U.S. PATENT DOCUMENTS

| | | | |
|---|---|---|---|
| 4,758,756 | 7/1988 | Pouillange | 310/152 |
| 5,128,570 | 7/1992 | Isozaki | 310/49 R |
| 5,239,218 | 8/1993 | Hashimoto et al. | 310/68 B |
| 5,272,401 | 12/1993 | Lin | 310/49 R |
| 5,289,064 | 2/1994 | Sakamoto | 310/49 R |
| 5,334,894 | 8/1994 | Nakagawa | 310/49 R |
| 5,386,161 | 1/1995 | Sakamoto | 310/49 R |
| 5,760,503 | 6/1998 | Tsushida et al. | 310/49 R |
| 5,773,908 | 6/1998 | Stephens et al. | 310/254 |
| 5,844,346 | 12/1998 | Kolomeitsev et al. | 310/254 |

*Primary Examiner*—Nestor Ramirez
*Assistant Examiner*—Guillermo Perez
*Attorney, Agent, or Firm*—Oliff & Berridge, PLC

[57] ABSTRACT

The object of the present invention is to increase torque generation of a motor, to minimize a motor size, and to reduce a motor cost by improving a magnetic circuit of a rotor. In order to achieve the object and make effective use of the power of each permanent magnet within the entire motor, the present invention provides a motor comprising magnetic circuits for the pole N 5 commonly connected to the north pole of permanent magnets 7, magnetic circuits for the pole S 6 commonly connected to the south pole of permanent magnets 7. Also, the motor further comprises magnetic poles N in the shape of protruding poles of the north pole and the magnetic poles S in the shape of protruding poles of the south pole. The magnetic poles N, forming a part of the magnetic circuits for the pole N, are placed on a part around the perimeter of the rotor, and the number R of the magnetic poles N is different from the number m of stator poles. The magnetic poles S, forming a part of the magnetic circuit for the south pole, are placed on a part around the perimeter of the rotor alternately in a rotational direction of the rotor with the magnetic poles N in the shape of protruding poles of the north pole and the number of the magnetic poles S is R.

5 Claims, 9 Drawing Sheets

PERMANENT MAGNET MOTOR WITH SPECIFIC MAGNETS AND MAGNETIC CIRCUIT ARRANGEMENT

BACKGROUND OF THE INVENTION

1. Field of the Invention

The present invention generally relates to a vernier type motor having permanent magnets placed on a rotor thereof, and more particularly to an improved rotor structure of the vernier type motor.

2. Description of the Related Art

Figure 11:
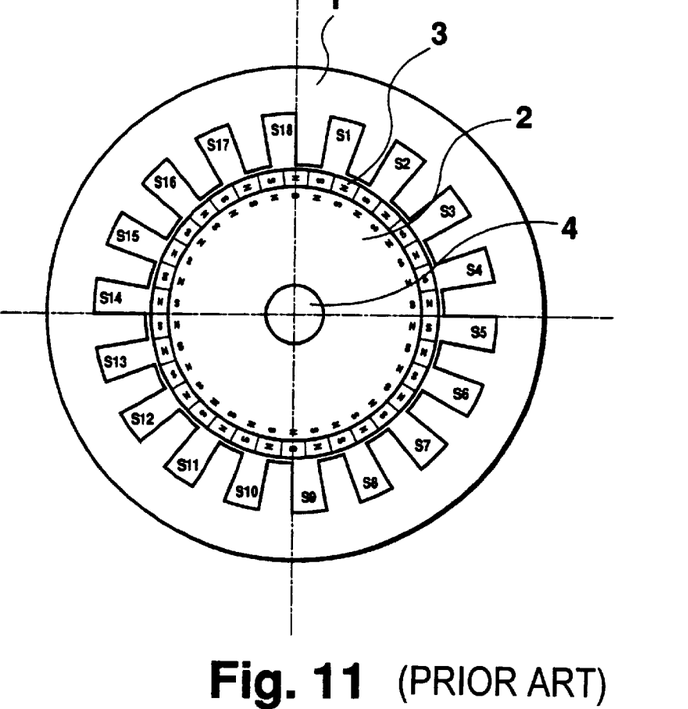
FIG. 11 is a sectional view of a motor incorporating permanent magnets in accordance with the prior art.

FIG. 11 shows a relationship between a stator and a rotor of a conventional vernier type motor having permanent magnets placed on the rotor. Numeral 1 indicates the stator and marks from S1 to S18 indicate slots. A bipolar three-phase alternating current winding, commonly used for such an induction motor, is looped through each slot. Teeth of the stator are formed so that the width of each front end is almost equal to the width of each of the inlets of the slots. Therefore, magnetic reluctance noticeably changes at regular intervals in a direction of stator rotation viewed from the rotor. Numeral 2 indicates the rotor and 17 poles of permanent magnets are equally spaced around the perimeter of the rotor as shown in the figure. Numeral 4 is an axis of the rotor.

From Fleming's rule, the force F generated by a single turn of the winding for a motor is generally and as a principle derived as follows:

$$F = B \cdot I \cdot L$$

where B is magnetic flux density, I is electric current, and L is effective length of an electric wire which is equivalent to twice the length of the rotor's effective length. The motor power P is represented as follows:

$$P = F \cdot SP = F \cdot r \cdot d\theta / dt$$

where SP is a peripheral speed of the rotor, r is a radius of the rotor, and θ is a rotational angle of the rotor.

Taking voltage here to be V, the electric power P of the motor is represented as follows:

$$P = V \cdot I = d\phi / dt \cdot I$$

where φ is flux leakage of a single turn of the winding. Both of the formulas above lead with, $P = F \cdot r \cdot d\theta/dt = d\phi/dt \cdot I$
As a consequence, torque T generated by the motor is represented as follows:

$$T = F \cdot r = d\theta / d\phi \cdot I$$

That is, the torque T produced by the motor is proportional to the rate of change in rotation dφ/dθ of magnetic flux produced by linkage against the winding.

Accordingly, with reference to the case, for example, of a conventional synchronous motor of bipolar permanent magnet type comprising a stator identical to that shown in FIG. 11 but not being a vernier type motor, which is not illustrated, produced torque T (the rate of change in rotation dφ/dθ of magnetic flux φ produced by linkage against winding) is estimated to be simply proportional to magnetic flux B.

The motor shown in FIG. 11 is considered here in the same manner as mentioned above. Suppose that, for example, a single turn of a winding is looped through a slot S5 in the direction from an upper surface to the bottom of the paper, in which FIG. 11 is illustrated, and through S14 in the direction from the bottom to the upper surface of the paper. With respect to the rate of change in rotation of flux leakage φ against the winding, represented by dφ/dθ≈Δφ/Δθ, in this case, infinitesimal change in rotation Δθ is assumed to slightly rotate in a clockwise direction. Infinitesimal change in magnetic flux Δφ then appears to increase magnetic flux of the north pole in a direction from the reverse side of the paper to an upper side on eight or nine respective protruding poles of the stator in FIG. 11. Therefore, the rate of change in rotation Δφ/Δθ of magnetic flux φ would show approximately an eightfold increase using simple theory, as compared to the above-mentioned synchronous motor of permanent magnet type, and the same applies to generated torque. As has been stated, a vernier type motor having permanent magnets placed on the rotor is characterized by generation of high torque. However, the effects of limitations of driving frequency and leaked inductance of a motor, in general, make high-speed rotation difficult because the driving frequency for controllable drive increases by approximately eight times.

The motor shown in FIG. 11 has a problem in that effective use has not been made of the magnetic flux of respective permanent magnets. For example, considering magnetic flux generated on the protruding pole of the stator located between the slot S4 and S5, the protruding pole of the stator faces to the north pole of a permanent magnet over a slight gap. This leads to magnetic flux of the north pole appearing on the protruding pole of the stator, which is, at the same time, influenced by many components which close magnetic flux between the north pole and the south pole because of leakage flux from the adjoining pole at each side of the north pole through a nonmagnetic part such as the gap between protruding poles of the stator. The portion of magnetic flux of the north pole which closes the magnetic flux of the south pole is not utilized in a driving operation of the motor. Accordingly, it is impossible to make full use of magnetic flux of the north pole on the protruding pole of the stator located between the slot S4 and S5, and the same on the other respective protruding poles of the stator, which in turn causes insufficient effective magnetic flux to be obtained. As a result, this produces a problem that the motor torque decreases.

Figure 12:
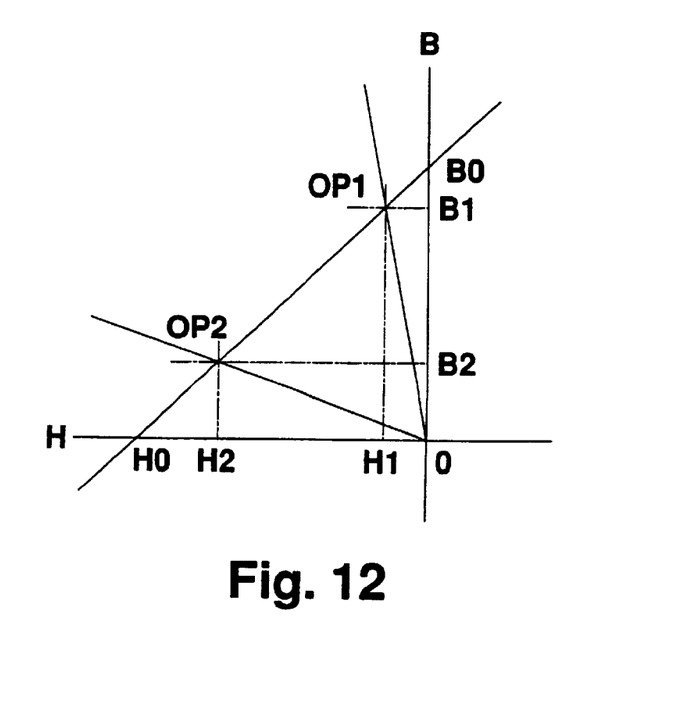
FIG. 12 is an operating characteristic diagram in regard to magnetic flux B and magnetomotive force H of a permanent magnet.

The leakage flux of the south pole is explained below through the magnetic properties of a permanent magnet. Marks from B0 to H0 indicated in FIG. 12 show a characteristic example of typical magnetic flux density B and magnetomotive force H of a rare-earth magnet. The operating point of the north pole of a magnet opposing the protruding pole of the stator located between the slot S4 and S5 is OP1. At this point, magnetomotive force H1 mainly functions as the magnetomotive force to an air-gap part and its magnetic flux density is B1. On the other hand, the operating point of the adjoining south poles of each side of the north pole is OP2. At this point, as leakage flux in a nonmagnetic part such as a gap between the slot S4 and S5 is generated, a high magnetomotive force H2 acts and magnetic flux density therein is B2. The portion of B2 closes magnetic flux between adjoining magnets and does not function effectively for a motor. As a consequence, magnetic flux acting in the operation of a motor is that equal to the magnetic flux density of B1 minus B2. Depending on the structure of a motor the value of magnetic flux varies, but the value of B2 may often be more than half of B1 so that half of the power of a permanent magnet can not be utilized in many cases.

Another problem is as follows. Maximum magnetic flux density of magnetic steel in a portion of protruding poles on the stator is as high as 1.7 tesla. Opposed to this, the maximum magnetic flux density in a portion of protruding poles on the rotor is only 1.0 tesla when a rare-earth magnet, whose residual flux density is high, is used and limitations in structure of the rotor interfere with increasing magnetic flux density. Therefore, an increase of motor torque has been expected according to an increase of magnetic flux density in each magnetic pole of the rotor.

SUMMARY OF THE INVENTION

According to the present invention, a motor comprises a common magnetic circuit for the pole N commonly connected to each north pole of permanent magnets and a common magnetic circuit for the pole S commonly connected to each south pole of permanent magnets in order to make effective use of the power of each permanent magnet within the entire motor. The motor further comprises the magnetic poles N in the shape of protruding poles and the magnetic poles S in the shape of protruding poles. The magnetic poles N, forming a part of the magnetic circuit for the pole N, are placed on a part around the perimeter of the rotor, and the number R thereof is different from the number m of stator poles. The magnetic poles S, forming a part of the magnetic circuit for the pole S, are placed on a part around the perimeter of the rotor alternately in the direction of the rotor rotation with the magnetic poles N in the shape of protruding poles being R in number.

In the present invention, it is also preferable to comprise an auxiliary magnetic pole N that connects each of the above-stated magnetic poles N to an adjacent one and an auxiliary magnetic pole S that connects each of the above-stated magnetic poles S to an adjacent one.

The motor may also comprise a common permanent magnet in the shape of a circular plate incorporated in the rotor and commonly connected to each magnetic pole therein.

The motor may also comprise the common permanent magnet in the shape of a disc incorporated in the rotor and commonly connected to each magnetic pole therein in addition to a plurality of individual permanent magnets placed in the proximity of each magnetic pole on the rotor.

Forming common magnetic circuits for the north pole and the south pole respectively, the magnetomotive force of each magnetic pole occurring on a part of the stator becomes almost uniform. As a consequence of this, the magnetic flux existing on nonmagnetic parts such as a gap or a void would be roughly proportional to magnetic reluctance therein. This means that an adverse phenomenon in which a large leakage flux, as in the past, appears by the action of high magnetomotive force where magnet reluctance is high could decrease.

It would be possible to achieve magnetic flux density as high as 1.7 tesla with electromagnetic steel as the material for a magnetic pole of the rotor.

In order to use a permanent magnet so as to be common for each magnetic pole and use magnet flux density with the value close to the saturation flux density of magnetic steel, it is required to place a magnetic circuit for the pole N, a magnetic circuit for the pole S, and an insulating part in an efficient manner in the inside of the rotor. However, there has been a problem that the space within the rotor could not be utilized effectively. To be more specific, for the purpose of switching magnetic poles on the rotor surface between the north pole and the south pole and achieving a value close to 1.7 tesla, there was not enough space for the inductive magnetic path to induce magnet flux from each part of a magnetic pole on the rotor surface to the part of the common magnetic circuit for the pole N, or that for the pole S.

As a remedy to the problem mentioned above, this invention provides a method of enhancing the effective magnetic flux density of each part of magnetic poles on the rotor surface using the aforementioned structure of the motor. Referring to an example, when a certain amount magnet flux is required on a particular part of the rotor surface, a plurality of individual permanent magnets placed in the proximity of the rotor perimeter supply of the required flux and other individual permanent magnets placed on a different location supply the half of the required flux to magnetic poles on the abovementioned particular part of the rotor perimeter by way of the common magnetic circuit and the inductive magnetic path which is a part of the circuit. Such operations allow the inductive magnetic path to require only half of the magnetic flux needed on the rotor surface. This leads to the generation of a large amount of magnetic flux on the rotor surface and results the production of large rotation torque.

Moreover, placing a common permanent magnet between the common magnetic circuit for the pole N and a common permanent magnet for the pole S, the magnetic flux generated by the rotor may increase further. Although the structure of this invention is a little more complex than that of the conventional motor shown in FIG. 9 and tends to generate more leakage flux within the rotor, the structure of this invention may compensate for the leakage flux and makes the motor produce more rotational torque.

DESCRIPTION OF PREFERRED EMBODIMENTS

Figure 1:
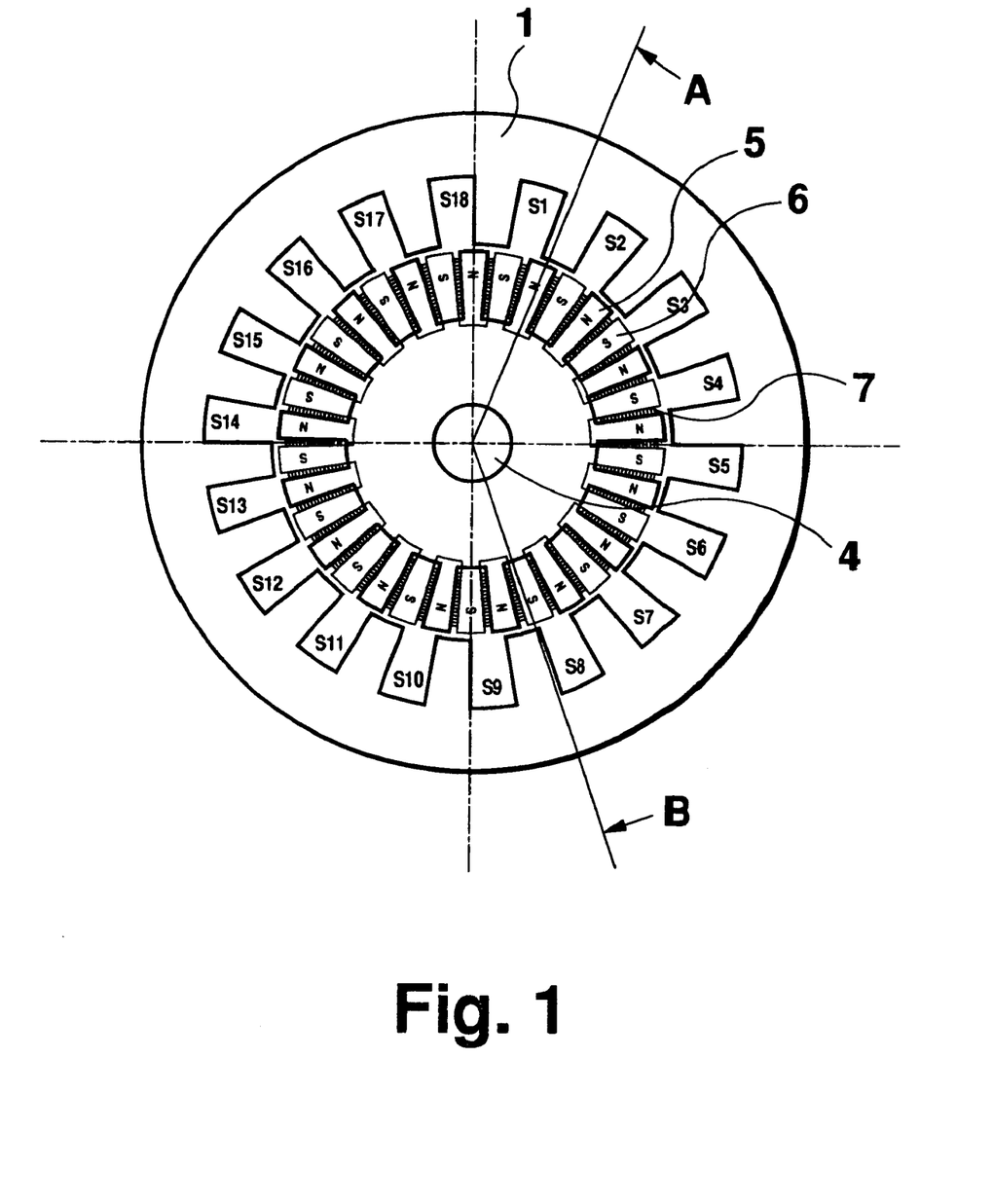
FIG. 1 is a sectional view of a permanent magnet motor in accordance with an embodiment of this invention.
Figure 2:
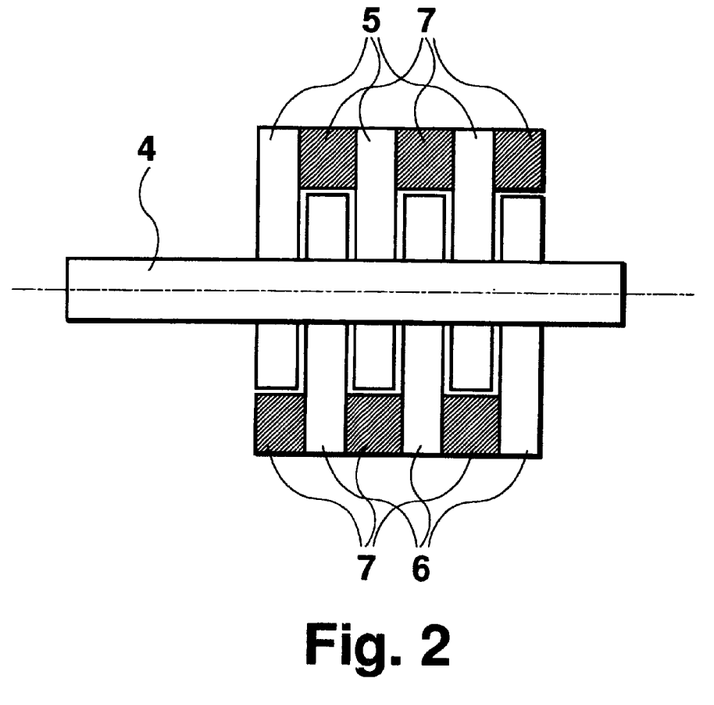
FIG. 2 is an axial sectional view of the rotor of FIG. 1.
Figure 3:
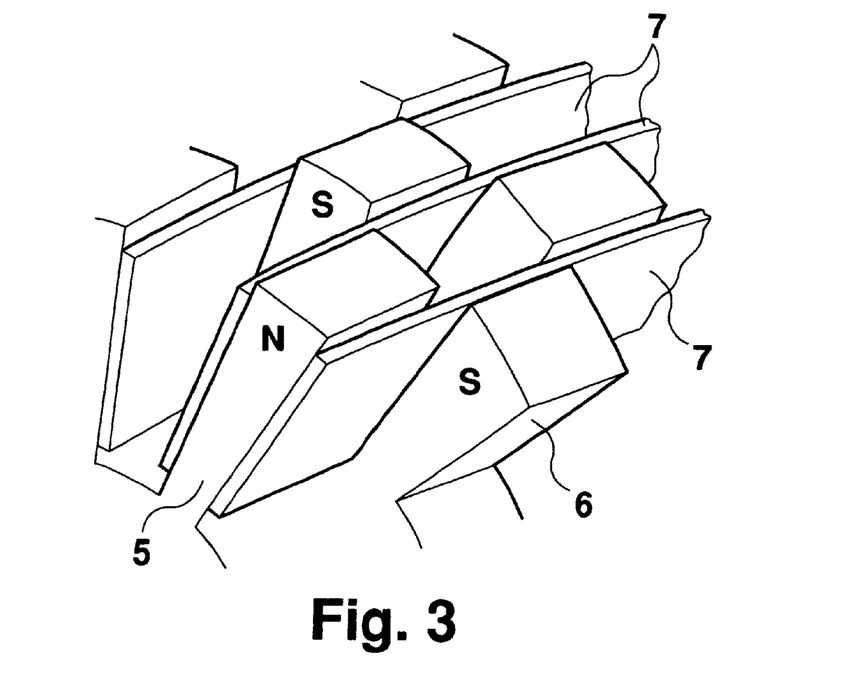
FIG. 3 is a perspective view showing a principle part of a rotor of the motor described in FIG. 1.

The structure of a stator and rotor incorporated in a permanent magnet motor in accordance with an embodiment of this invention is shown in FIG. 1. The stator indicated by numeral 1 is laminated with electromagnetic steel in the axial direction and provided with 18 slots indicated by marks from S1 to S18. A bipolar three-phase alternating current winding, commonly used for an induction motor, is looped through each slot. Teeth of the stator are formed so that the width of each front end is almost equal to the width of each slot inlet. Therefore, magnetic reluctance changes noticeably at regular intervals in a direction of stator rotation viewed from the rotor. The rotor has a slightly complicated shape wherein 17 sets of the north pole and the south pole are placed around the perimeter. Materials and basic structure of the rotor are constructed in much the same fashion as the stator wherein electromagnetic steel is laminated in the axial direction but the electromagnetic steel is not a restrictive condition. As the number of slots is 18, a relationship between the slots of the stator and magnetic poles of the rotor is established such that each of their relative positions is deviated. An axial sectional view of only the rotor part indicated by section A and B is shown in FIG. 2 and a perspective view of a principle part thereof is shown in FIG. 3. Numeral 4 represents a non-magnetic rotor axis of stainless steel, for example. The magnetic circuits for the pole N 5 and the magnetic circuits for the pole S 6, illustrated in FIG. 1, FIG. 2, and FIG. 3, have the same shape. They are alternately placed in a rotational direction shifting 1/34 of a turn and also placed alternately in a direction of the rotor axis as shown in FIG. 2. As the magnetic circuits for the pole N 5 and the magnetic circuits for the pole S 6 overlap in an axial direction in the drawings, the magnetic circuits for the pole N 5 are indicated by a full line and the magnetic circuits for the pole S 6 are indicated by a broken line for the sake of understanding. Each numeral 7 represents a permanent magnet shaped in a rectangle which is elongated in a direction of the rotor axis over each magnetic circuit 5 and 6. Magnetic poles of the permanent magnets are indicated by hatched lines in FIG. 1 and direct toward S or N as shown in the figure. Therefore a part of the rotor perimeter belonging to the magnetic circuits for the pole N 5 is magnetized to the north pole and a part belonging to the magnetic circuits for the pole S 6 is magnetized to the south pole. The magnetic circuits for the pole N 5 are magnetically separated from the magnetic circuits for the pole S 6 in the inside of the rotor.

Figure 4:
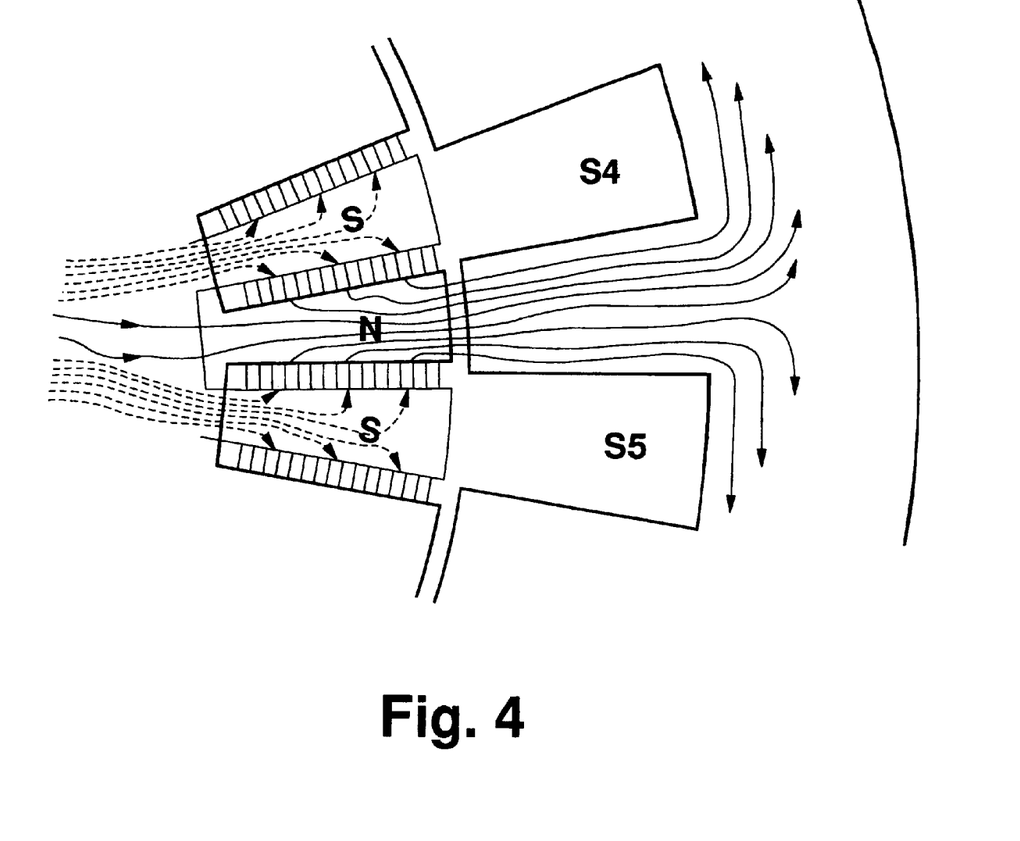
FIG. 4 is an enlarged segmentary view of FIG. 2.

Referring now to the operation of the permanent magnet motor illustrated in FIG. 1, a basic concept of the operation is similar to the concept of the motor of FIG. 11 stated already. Suppose that, for example, a single turn of a winding is looped through a slot S5 in the direction from an upper surface to the bottom of the paper in which FIG. 1 is illustrated, and through S14 in the direction from the bottom to the upper surface of the paper. With respect to the rate of change in rotation of flux leakage $\phi$ against the winding, represented by $d\phi/d\theta \approx \Delta\phi/\Delta\theta$, in this case, infinitesimal change in rotation $\Delta\theta$ is assumed to rotate slightly in a clockwise direction. Infinitesimal change in magnetic flux $\Delta\phi$ then appears so as to increase magnetic flux of the north pole in a direction from the reverse side of the paper to an upper side on eight or nine respective protruding poles of the stator in FIG. 1. Therefore, the rate of change in rotation $\Delta\phi/\Delta\theta$ of magnetic flux $\phi$ would show an approximately eightfold increase compared to the bipolar synchronous motor of permanent magnet type mentioned before and the same applies for generated torque. The motor of FIG. 1 differs from the motor of FIG. 11 in magnetic operations of permanent magnets which vary depending on the structure thereof. As shown in FIG. 4 of an enlarged view of FIG. 1, the permanent magnets 7 of the motor operate as follows. In a portion where the magnetic poles of the rotor face to a portion of the protruding poles of the stator, magnetic flux occurring from the permanent magnets placed on the side surface of the magnetic poles flows to a portion of protruding poles of the slots. Simultaneously, surplus magnetic flux occurring from other permanent magnets flows to the magnetic poles of the rotor through magnetic circuits on the central portion of the rotor. As a result, the surplus magnetic flux is provided to the portion of the protruding poles of the stator facing to the magnetic poles of the rotor. In another portion where the magnetic poles of the rotor face to a portion of the slots of the stator, magnetic reluctance on the portion of the slots is high. Therefore, magnetic flux occurring from the permanent magnets placed on the side surface of the magnetic poles of the rotor is, contrary to that mentioned above, provided to other magnetic poles with lower magnetic reluctance, that is to a portion where the magnetic poles face to the protruding poles of the stator, through magnetic circuits on the central portion of the rotor. Since the magnetic flux of each permanent magnet is thus provided to the magnetic poles having low magnetic reluctance through a common magnetic circuit for the pole N or that for the pole S, the permanent magnets is effectively utilized. This makes it possible to generate high torque. Referring to the BH properties of the permanent magnet shown in FIG. 12, every operating point of respective permanent magnets is close to P1. Large magnetic flux equivalent to B1 therefore works efficiently. There is also only a very slight possibility of producing magnetic flux equivalent to B2 which acts at the operating point OP2, of supplying major magnetomotive force H2 to the portion of the slots, and of interfering with the operation of the motor as in the case of the motor shown in FIG. 11.

Figure 5:
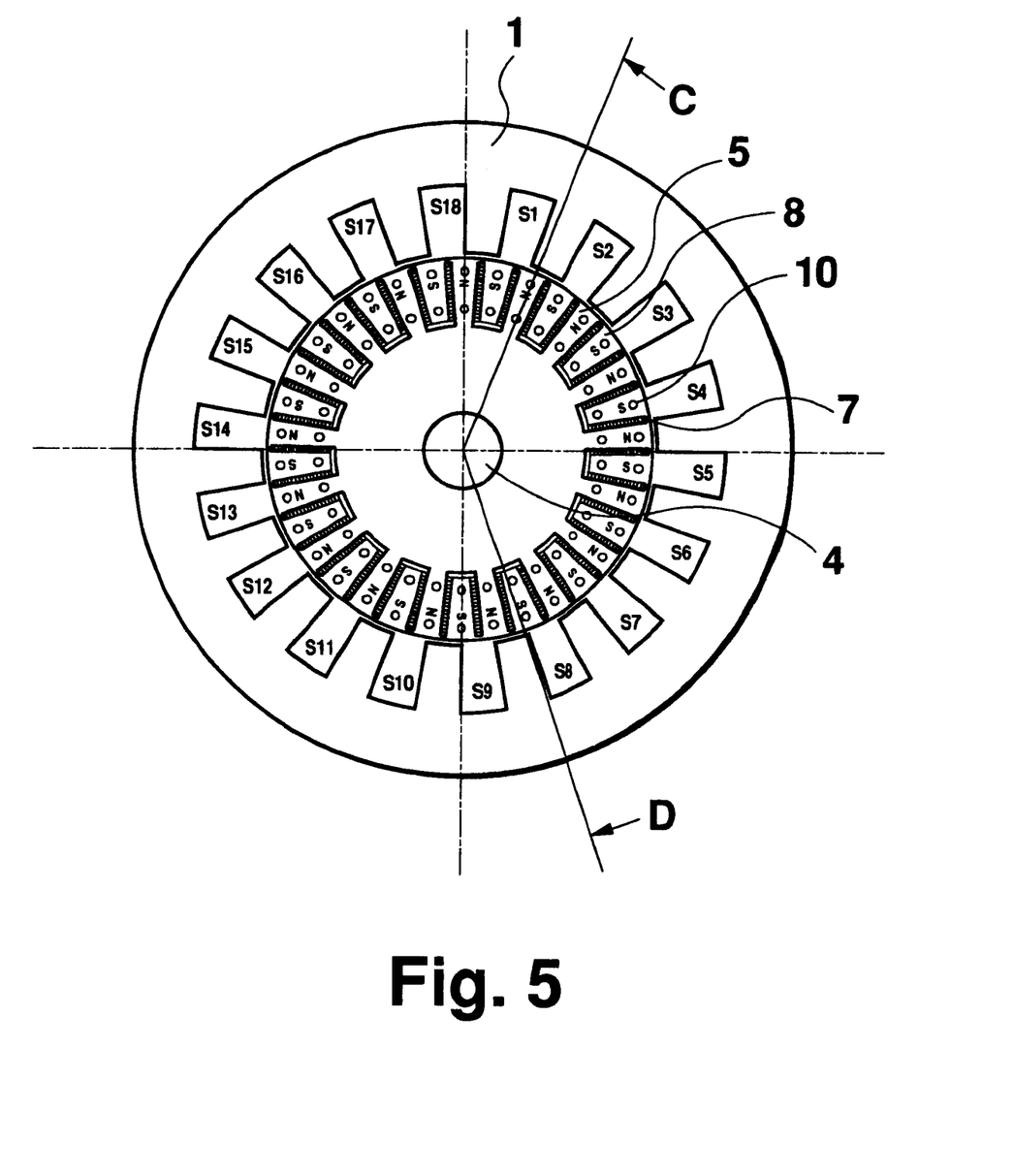
FIG. 5 is a sectional view of a permanent magnet motor in accordance with another embodiment of this invention.
Figure 6:
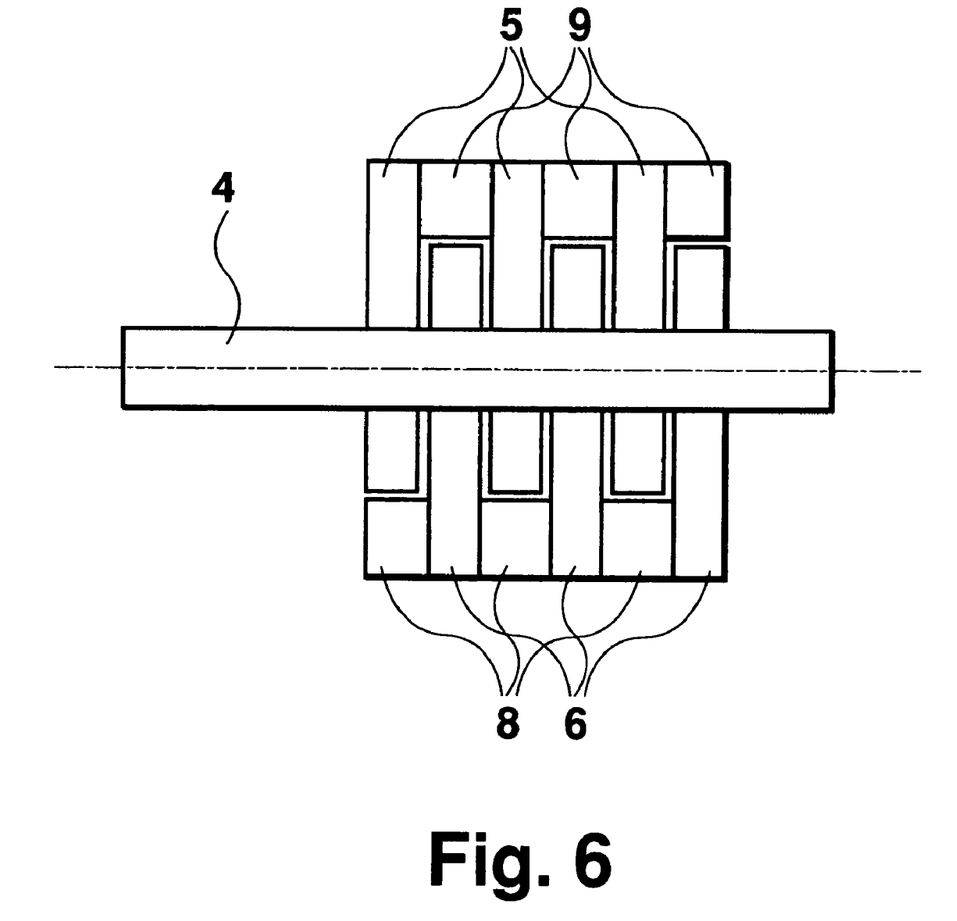
FIG. 6 is an axial sectional view of the motor of FIG. 5.
Figure 7:
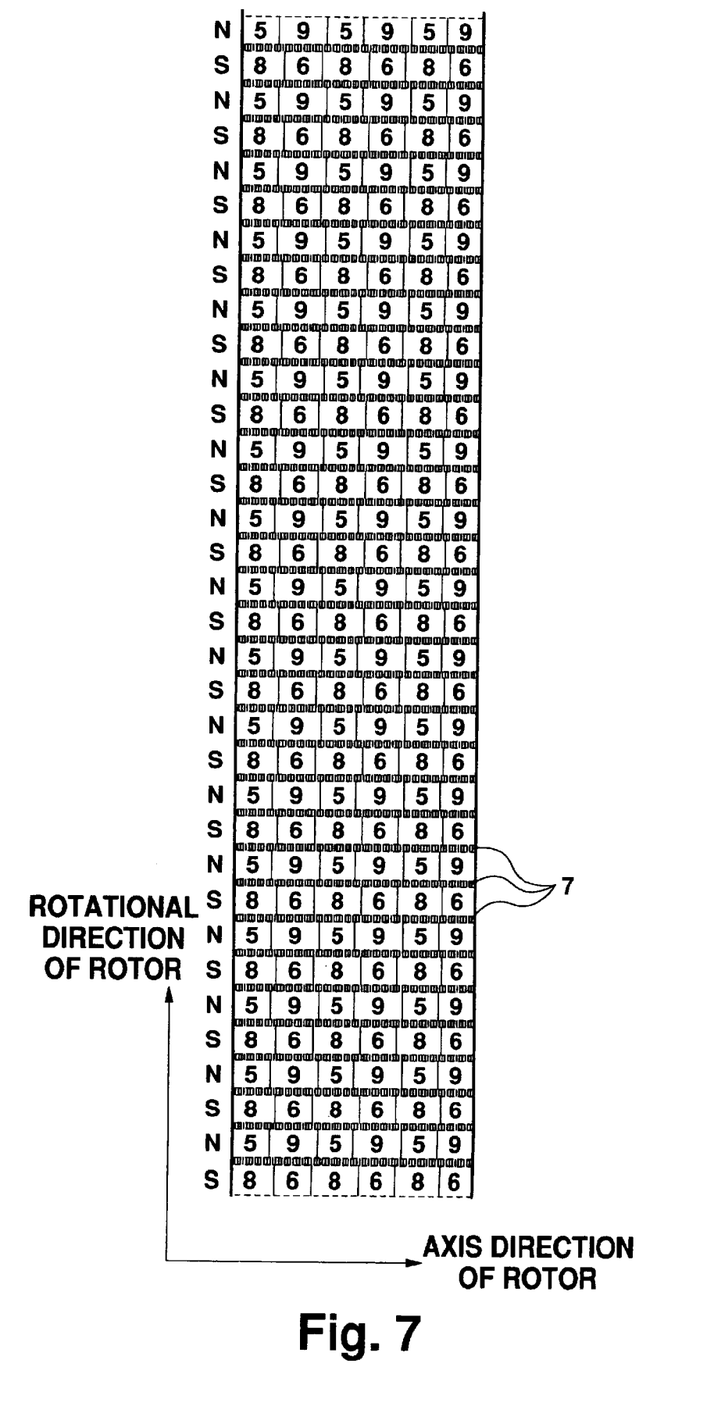
FIG. 7 is a drawing of a rotor surface of the motor of FIG. 5, developed in plan in the direction of its rotation.

FIG. 5 shows a sectional view of a permanent magnet motor in accordance with another embodiment of this invention. The basic structure of this embodiment is identical with the permanent magnet motor of FIG. 1. An axial sectional view of only a rotor part indicated by section C and D is shown in FIG. 6. In contrast to the motor described in FIG. 1 and FIG. 2, auxiliary magnetic poles N 9 and auxiliary magnetic poles S 8 indicated in FIG. 6 are added. Regarding the motor of FIG. 2, each magnetic pole of the rotor is not successive in the axial direction. The motor of this embodiment is constructed so that each magnetic pole of the rotor is placed successively in the axial direction, as shown in FIG. 6. The outside shape of the rotor of this motor is illustrated in FIG. 7, developed in plan in the direction of its rotation. In actual fact, permanent magnets 7 are not recognized from the outside of the rotor. For the sake of understanding, however, the permanent magnets 7 located in the inside of the rotor are shown by a broken line in FIG. 7 where 17 sets of the north poles and the south poles are placed in the up-and-down direction of the paper, that is, in a rotational direction of the rotor. Magnetic circuits of the rotor are constructed with electromagnetic steel of required shape punched by a press and laminated in an axial direction. Numeral 10 in FIG. 5 is a stacking part to laminate the electromagnetic steel automatically with the press. The stacking part 10 is constructed as follows. Approximately half the thickness of electromagnetic steel is squeezed by the press and fitted with adjacent electromagnetic steel in order to crimp and fix electromagnetic steel together. The perimeter of the rotor shown in FIG. 5 is formed into a circle using a small part, and each of the magnetic poles of the rotor are connected together with the small part. This connection prevents individual parts of electromagnetic steel from being dispersed when punched by the press thus simplifying assembly. The connection of the perimeter portion of the rotor is not necessary for electromagnetic operation. The magnetic path is slightly detrimental because magnetic flux of each magnetic pole leaks owing to the connection.

Referring now to the operation of the permanent magnet motor depicted in FIG. 5, auxiliary magnetic poles N 9 and auxiliary magnetic poles S 10 are added in this embodiment. Therefore, more magnetic flux of each permanent magnet 7 placed in an axial direction in the proximity of the rotor perimeter is provided to each magnetic pole of the rotor compared with the motor depicted in FIG. 1. This structure may increase torque generated by the motor.

Figure 8:
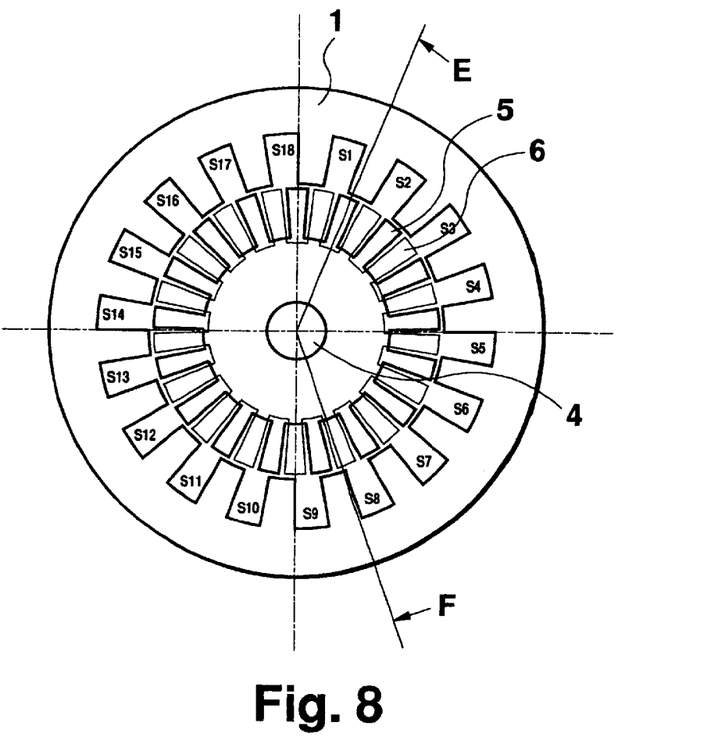
FIG. 8 is a sectional view of a permanent magnet motor in accordance with another embodiment of this invention.
Figure 9:
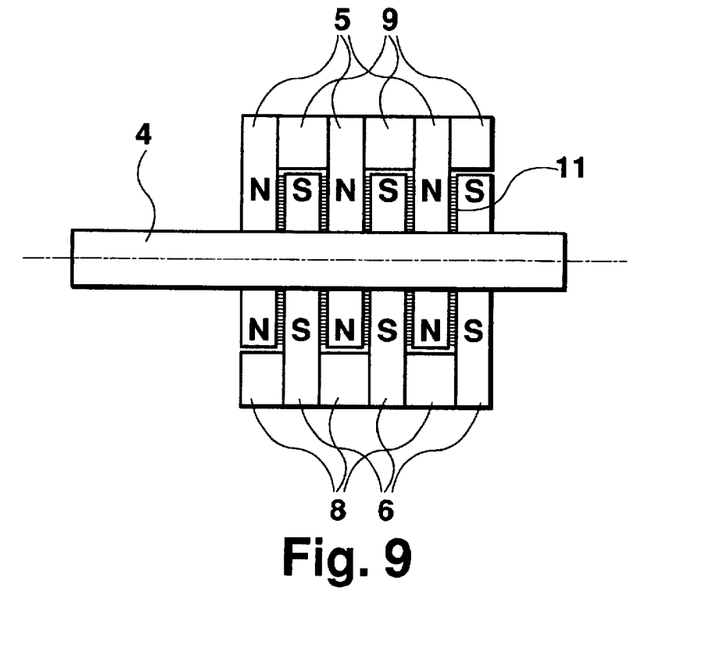
FIG. 9 is an axial sectional view of the motor of FIG. 8.

FIG. 8 shows a sectional view of a permanent magnet motor in accordance with another embodiment of this invention. An axial sectional view of only the rotor part indicated by section E and F is shown in FIG. 9. The basic structure of this embodiment is identical to the permanent magnet motor of FIG. 1. However, the permanent magnets 7 placed in the proximity of the perimeter of the rotor are not attached. Permanent magnets shaped in a circular plate, indicated by numeral 11 in FIG. 9, are placed between the magnetic circuit for the pole N 5 and permanent magnets for the pole S 6 are placed inside the rotor instead of the permanent magnets 7. The permanent magnets 11 are not necessarily shaped in a circular plate and may be formed in various shapes.

The motor of this embodiment operates similarly to the motors shown in FIG. 1 and FIG. 5, and will be described in the following. The permanent magnets 11 placed inside the rotor, as stated above, provide magnetic flux to each of the magnetic poles on a part around the perimeter of the rotor. In comparison to the motor shown in FIG. 1 or FIG. 5, the motor of this embodiment needs fewer permanent magnets and has the advantage of being simplified. As for the permanent magnet motor of FIG. 6, nonmagnetic material such as stainless steel is used for the rotor axis and the magnetic circuit for the pole N 5 is magnetically separated from the magnetic circuit for the pole S 6 through a gap, for example. In spite of the separation, the extent of the gap is not sufficient to completely prevent generation of leakage flux. The permanent magnet motor of the FIG. 9 has the permanent magnets 11 located at a place where the leakage flux is likely tot appear. This therefore has the effect of reducing the leakage flux.

Referring now to a permanent magnet motor in accordance with another embodiment of this invention, this motor is identical to the permanent magnet motor described in FIG. 5 and FIG. 6 but the permanent magnets 11 shown in FIG. 9 are added therein. FIG. 5 shows a sectional view of this motor along a radial direction and FIG. 9 shows an axial sectional view indicated by section A and B. As the north pole and the south pole of every motor in this invention are arranged close to each other, each boundary area of the magnetic poles is constructed with a gap or the like so as to vary magnetic flux. However, owing to the limitations of the structure on gap width, a considerable amount of leakage flux may appear. With respect to compensation for leakage flux, the permanent magnet motor of this embodiment is added with the permanent magnets 11 to the permanent magnet motor described in FIG. 5. The permanent magnets 11 reduce the leakage flux and supply magnetic flux to each magnetic pole on the perimeter of the rotor electrically in parallel with the permanent magnets 7 in the proximity of a part around the perimeter of the rotor. This makes the magnetic flux of each magnetic pole in the proximity of the part around the perimeter of the rotor high and increases torque generated by the motor.

Figure 10:
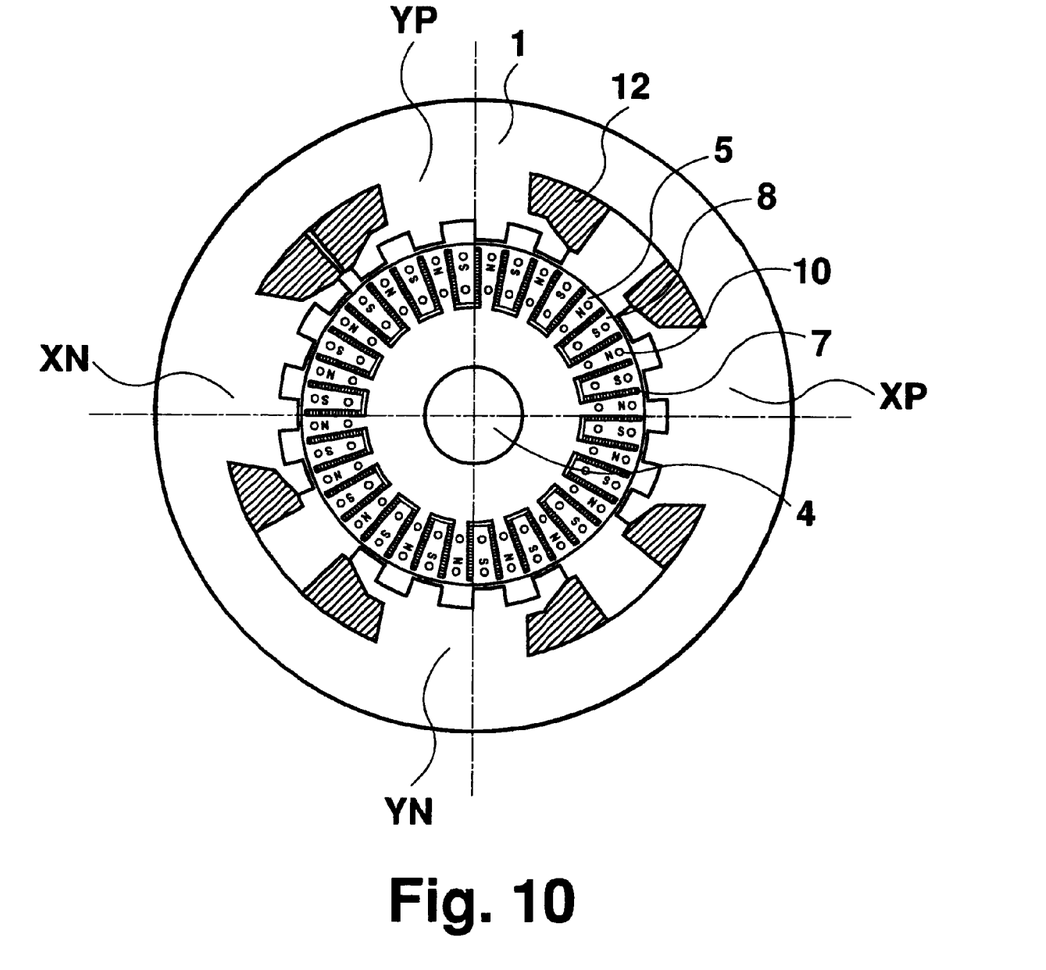
FIG. 10 is a sectional view of a permanent magnet motor in accordance with another embodiment of this invention.

FIG. 10 shows a permanent magnet motor in accordance with another embodiment of this invention. The stator has four magnetic poles for the stator of XP, XN, YP, and YN with four protruding poles respectively placed in a rotational direction of the stator. Also, a bipolar alternating current winding 12 is wound through each of the magnetic poles for the stator. The poles XP and XN have opposite phases of single-phase magnetic poles for the stator and their respective windings are wound in an inverse series. The poles YP and YN have opposite phases of other phase magnetic poles for the stator than single phase and their respective windings are wound in an inverse series. The phase of the poles XP and XN relatively shifts by 90 degrees in terms of electrical degrees from the phase of the poles YP and YN. The rotor of this motor is similar to the rotor of the motor shown in FIG. 5. Other rotors described in the aforementioned figures may be applied to the motor of this embodiment.

The motor of this embodiment operates such that the rotational torque is generated by feeding a bipolar alternating current through respective windings in synchronization with the rotation of the rotor. With respect to the amount of rotational torque, the rate of change in rotation $\Delta\phi/\Delta\theta$ of magnetic flux $\phi$ would show approximately a fourfold increase compared to the bipolar synchronous motor of permanent magnet type mentioned before and the same applies for generated torque.

Although this invention has been described with respect to the embodiments, it is to be understood that the structure of the motors of this invention is not limited in its application to a motor of a rotational type, and it may also be applied to a linear motor through linearly developing the structure. A modification through partial deletion of the permanent magnets placed in each part may be embraced by this invention, since the partial deletion of the permanent magnets does not alter the effect.

Although the motors of a three-phase alternating current winding and a two-phase alternating current winding are depicted in the embodiments, motors of other-phase alternating current windings may also be utilized without departing from the spirit and scope of the invention.

This invention has the effect of increasing the torque generated by the motor, since the permanent magnets are capable of reducing magnetomotive force and magnetic flux that interfere with the operation of the motor. Simultaneously, the capability of the permanent magnet is effectively utilized through use of the magnetic circuits for the pole N, magnetic circuits for the pole S, auxiliary magnetic poles N, and auxiliary magnetic poles S. As a consequence, operative magnetic flux density and the torque generated by the motor increases. This allows the motor to achieve increased torque generation, smaller size, and low cost.

What is claimed is:

1. A permanent magnet motor comprising:

a stator wherein a three-phase alternating current winding is looped and a number m of teeth protrude from a slotted portion, being a part of the stator;

a plurality of individual permanent magnets placed on the inside of a rotor;

magnetic circuits for the pole N commonly connected to the north pole of a plurality of said permanent magnets;

magnetic circuits for the pole S commonly connected to the south pole of a plurality of said permanent magnets;

magnetic poles N in the shape of protruding poles of the north pole, forming a part of said magnetic circuits for the pole N, placed on a part around the perimeter of the rotor, and being R in number, where R is different from the number m; and magnetic poles S in the shape of protruding poles of the south pole, forming a part of said magnetic circuits for the pole S, placed on a part around the perimeter of the rotor alternately in a rotational direction of the rotor with said magnetic poles N in the shape of protruding poles of the north pole, and being R in number, wherein the magnetic circuits for the pole N commonly connect at least two of the magnetic poles N and the magnetic circuits for the pole S commonly connect at least two of the magnetic poles S.

2. A permanent magnet motor according to claim 1, further comprising:

auxiliary magnetic poles N for connecting said magnetic poles N to other adjacent magnetic poles N, and auxiliary magnetic poles S for connecting said magnetic poles S to other adjacent magnetic poles S; wherein said magnetic circuits for the pole N and said magnetic circuits for the pole S are alternately laminated in a direction of an axis of the rotor.

3. A permanent magnet motor comprising:

a stator wherein a three-phase alternating current winding is looped and a number m of teeth protrude from a slotted portion of slots, being a part of the stator;

common permanent magnets placed on the inside of a rotor and being common for each magnetic pole of the rotor;

magnetic circuits for the pole N commonly connected to the north pole of a plurality of said permanent magnets;

magnetic circuits for the pole S commonly connected to the south pole of a plurality of said permanent magnets;

magnetic poles N in the shape of protruding poles of the north pole, forming a part of said magnetic circuits for the pole N, placed on a part around the perimeter of the rotor, the number of magnetic poles N being R, where R is different from the number m; and magnetic poles S in the shape of protruding poles of the south pole, forming a part of said magnetic circuits for the pole S, placed on a part around the perimeter of the rotor alternately in a rotational direction of the rotor with said magnetic poles N in the shape of protruding poles of the north pole, wherein the magnetic circuits for the pole N commonly connect at least two of the magnetic poles N and the magnetic circuits for the pole S commonly connect at least two of the magnetic poles S.

4. A permanent magnet motor according to claim 2, further comprising common permanent magnets which are placed on the inside of the rotor and common for each magnetic pole of the rotor.

5. A permanent magnet motor comprising:

a number mm of magnetic poles on the stator which have a number TN of protruding poles and are located in the rotational direction;

a polyphase winding looped through each of the magnetic poles for the stator;

a plurality of individual permanent magnets placed on the inside of a rotor;

magnetic circuits for the pole N commonly connected to the north pole of a plurality of said permanent magnets;

magnetic circuits for the pole S commonly connected to the south pole of a plurality of said permanent magnets;

magnetic poles N in the shape of protruding poles of the north pole, forming a part of said magnetic circuits for the pole N, placed on a part around the perimeter of the rotor, and the magnetic poles N being RR in number, RR being more than or equal to the product of TN and mm; and magnetic poles S in the shape of protruding poles of the south pole, forming a part of said magnetic circuits for the pole S, placed on a part around the perimeter of the rotor alternately in a rotational direction of the rotor with said magnetic poles N in the shape of protruding poles of the north pole, wherein the magnetic circuits for the pole N commonly connect at least two of the magnetic poles N and the magnetic circuits for the pole S commonly connect at least two of the magnetic poles S.

* * * * *